UNITED STATES PATENT OFFICE 2,179,973

POLYVINYL HALIDE COMPOSITIONS

Claude H. Alexander, Cuyahoga Falls, Ohio, assignor to The B. F. Goodrich Company, New York, N. Y., a corporation of New York No Drawing. Application July 16, 1938,
Serial No. 219,627

6 Claims. (Cl. 260—88)

This invention relates to polyvinyl halides, and has as its object to provide polyvinyl halide compositions having improved properties as hereinafter explained.

Polyvinyl halide compositions have found many useful applications because of their extraordinary resistance to oxidation, organic solvents, acids, alkalis, and other deteriorating influences and because the mechanical properties of the compositions can be varied over a wide range by including plasticizers therein. Polyvinyl halide compositions are accordingly very widely used in lacquers and paints of many different kinds, as insulating materials, and as the basis of many useful molding compositions.

Compositions containing polyvinyl halides, however, have frequently tended to discolor in the course of the heat treatment required for molding them or after exposure to natural or artificial light for periods of time, which darkening was apparently caused by some fundamental change in the composition. It has further been found that although polyvinyl halides have good dielectric properties at ordinary temperatures, their power factor is considerably increased and their insulation resistance lowered at elevated temperatures. Solutions of polyvinyl halides also have a tendency to gel irreversibly in the presence of metals or metallic halides. They are particularly susceptible to the presence of iron, as little as .005% often causing gelling, particularly at elevated temperatures. The relationship between these manifestations of instability is not fully understood, but it has been discovered that treatment by the materials of this invention benefits the compositions in all of the respects mentioned above. These beneficial effects will be herein described as resulting from an increase in the stability of the compositions.

I have discovered that the stability of polyvinyl halide compositions is increased by incorporating therein a metallic silicate, said metal being selected from the class of metals consisting of the alkaline earth metals, silver, and lead, but no others. Silicates containing the metals of this invention in combination with other metals, asbestos for instance, and even materials as closely related to the alkaline earth silicates as talc (magnesium silicate) do not give the remarkable improvement in properties obtained by using the stabilizers herein claimed, and are accordingly not within the scope of this invention.

Although any of the silicates mentioned above beneficially affect polyvinyl halides in respect to the detrimental properties mentioned above, the members differ somewhat in their effect on specific properties. Thus, lead silicate is the best general stabilizer, having a very beneficial effect on the heat- and light-resistance, dielectric properties, and resistance to metallic halides. Calcium, barium, and strontium silicate produce compositions which have good light-stability, but the heat stability is not as permanent as that produced by lead silicate. Silver silicate is about as good a general stabilizer as lead silicate, but its expense ordinarily precludes its use.

Any type of polyvinyl halide such as alpha, beta, or gamma polyvinyl chloride, polyvinyl bromide, or even polyvinyl halide compositions formed by the conjoint polymerization of a vinyl halide such as vinyl chloride and a vinyl ester of an aliphatic acid such as vinyl acetate may be stabilized with the materials of this invention. Since the plasticized gamma polyvinyl chlorides described in U. S. Patent No. 1,929,453, issued to Waldo L. Semon, show the greatest commercial promise, the invention will be described in detail with reference to these materials, though it is to be understood that the invention is equally applicable to other polyvinyl halides as set forth above.

The silicates with which I stabilize the polyvinyl halide compositions may be naturally occurring minerals such as wollastonite, or they may be prepared synthetically by precipitation or fusing. I prefer to precipitate the silicates in as finely divided particles as possible, and I grind the fused silicates before use. The silicates prepared by fusion are easier and cheaper to prepare than the precipitated silicates, their composition can be varied at will, and in some cases they produce compositions having better electrical properties than the silicates prepared by precipitation. An excellent stabilizer is prepared by precipitation. An excellent stabilizer is prepared by fusing together litharge and silica, for instance, and grinding the product to a fine powder.

The stabilizer may be added at any time during the polymerization of the vinyl chloride or the plasticization of the same, though it is preferably added before the composition is heat-molded. A convenient method is to add the silicate in any suitable small proportion, from .5% to 10% of lead silicate for instance, to the powdered polyvinyl halide, add the plasticizer, and masticate the resulting mixture on a hot mixing mill at about 200°–220° F. If desired, the polyvinyl halide and the plasticizer may be homogenized on a mill and the silicate then added to the plastic product. The compositions obtained in all these cases do not darken appreciably when molded at 297° F. or when exposed to light for long periods of time, and have low power factor, low dielectric constant, and high insulation resistance when compared to similar compositions which do not contain any silicate.

In another embodiment, a plasticized gamma polyvinyl chloride composition is dissolved at an elevated temperature in a suitable solvent such as mesityl oxide or chlorotoluene, and the stabilizer is stirred into the solution. This hot solution will keep for weeks without gelling or darkening, even in the presence of small amounts of metals or metallic halides. The films formed by driving off the solvent from thin layers of this solution are also more resistant to discoloration by heat and light than unstabilized compositions.

To illustrate the decided change in electrical properties which the silicates produce, I will record some typical results obtained by using calcium silicate and lead silicate in a gamma polyvinyl chloride composition plasticized with tricresyl phosphate. The following compositions were prepared:

| Composition | A | B | C |
|---|---|---|---|
| Gamma polyvinyl chloride | 61.50 | 58.43 | 58.43 |
| Tricresyl phosphate | 38.50 | 36.57 | 36.57 |
| Calcium silicate | | 5.00 | |
| Lead silicate | | | 5.00 |

Tests showed that the compositions had the following values for power factor, and insulation resistance (measured on insulated wire), at varying temperatures:

| Temperature (deg. C.) | Power factor (percent) at 1000 cycles | | | | | |
|---|---|---|---|---|---|---|
| | 27 | 35.5 | 40 | 50 | 60 | 70 |
| Composition A | 14.9 | 15.1 | 13.6 | 11.5 | 13.0 | 20.3 |
| Composition B | 13.9 | 14.1 | 12.4 | 8.6 | 6.6 | 6.2 |
| Composition C | 13.8 | 14.0 | 12.0 | 8.0 | 5.7 | 5.0 |

| Temperature (deg. C.) | D. C. insulation resistance (megohms/mile) | |
|---|---|---|
| | 29 | 40 |
| Composition A | $4,770 \times 10^4$ | $575 \times 10^4$ |
| Composition B | $34,400 \times 10^4$ | $4,460 \times 10^4$ |
| Composition C | $41,000 \times 10^4$ | $7,310 \times 10^4$ |

It is obvious from the results of the tests that the electrical insulation properties of the compositions are greatly improved by the addition of a silicate, the lowering of the power factor and the raising of the insulation resistance being very pronounced.

The compositions of this invention may contain, besides the stabilizer, carbon black, zinc oxide, barytes, clay, wood flour, and other pigments and fillers commonly used in the rubber and plastics industries. The polyvinyl halides may also contain appreciable amounts of other polymers such as polyvinyl organic esters either conjointly polymerized therewith or incorporated therein after polymerization.

Though I have herein disclosed specific embodiments of my invention, I do not limit myself wholly thereto, for many modifications such as the substitution of equivalent materials and the variation of proportions used are within the spirit and scope of the invention as defined in the appended claims.

This application is a continuation in part of my copending application Serial No. 126,944 filed February 20, 1937.

I claim:

1. The method of stabilizing a polyvinyl halide which comprises incorporating therein a silicate of a member of the class of metals consisting solely of calcium, barium, strontium, lead, and silver.

2. The method of stabilizing plasticized gamma polyvinyl chloride which comprises incorporating calcium silicate therein.

3. The method of stabilizing plasticized gamma polyvinyl chloride which comprises incorporating lead silicate therein.

4. A composition of matter comprising a polyvinyl halide and a silicate of the class of metals consisting solely of calcium, barium, strontium, lead, and silver.

5. A composition of matter comprising plasticized gamma polyvinyl chloride and calcium silicate.

6. A composition of matter comprising plasticized gamma polyvinyl chloride and lead silicate.

CLAUDE H. ALEXANDER.